No. 840,190. PATENTED JAN. 1, 1907.
L. ANDERSON.
PISTON ROD CONNECTION.
APPLICATION FILED MAR. 14, 1904.
2 SHEETS—SHEET 1.
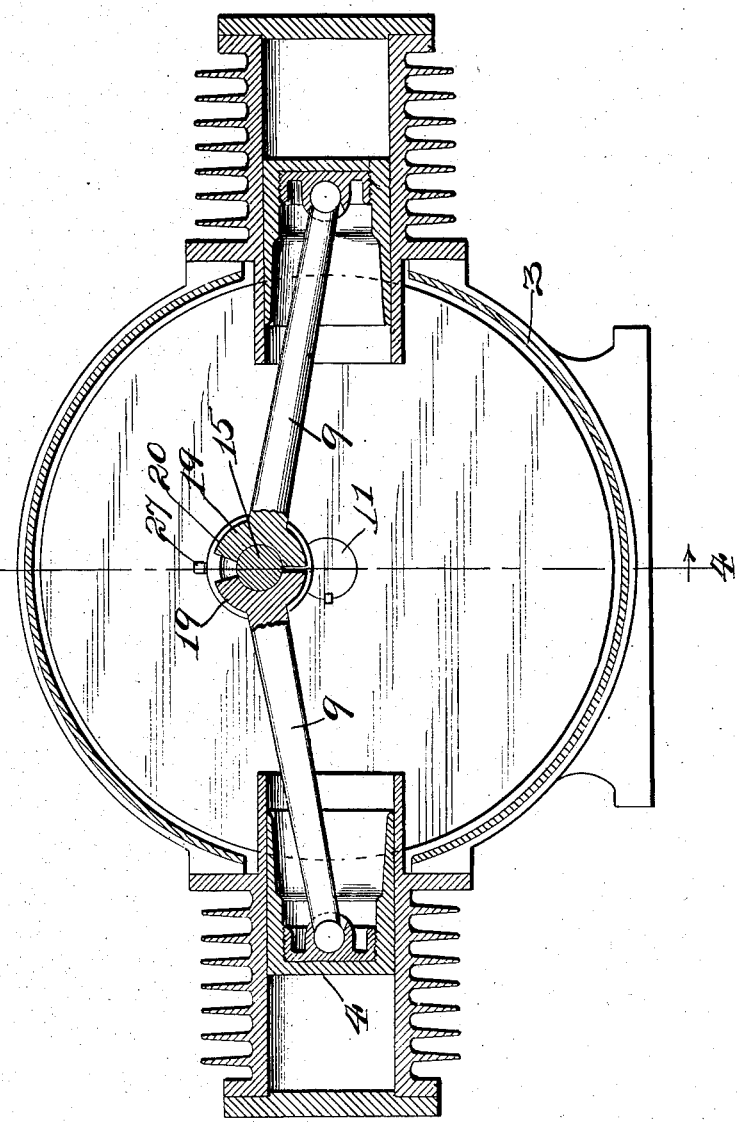

No. 840,190. PATENTED JAN. 1, 1907.
L. ANDERSON.
PISTON ROD CONNECTION.
APPLICATION FILED MAR. 14, 1904.
2 SHEETS—SHEET 2.
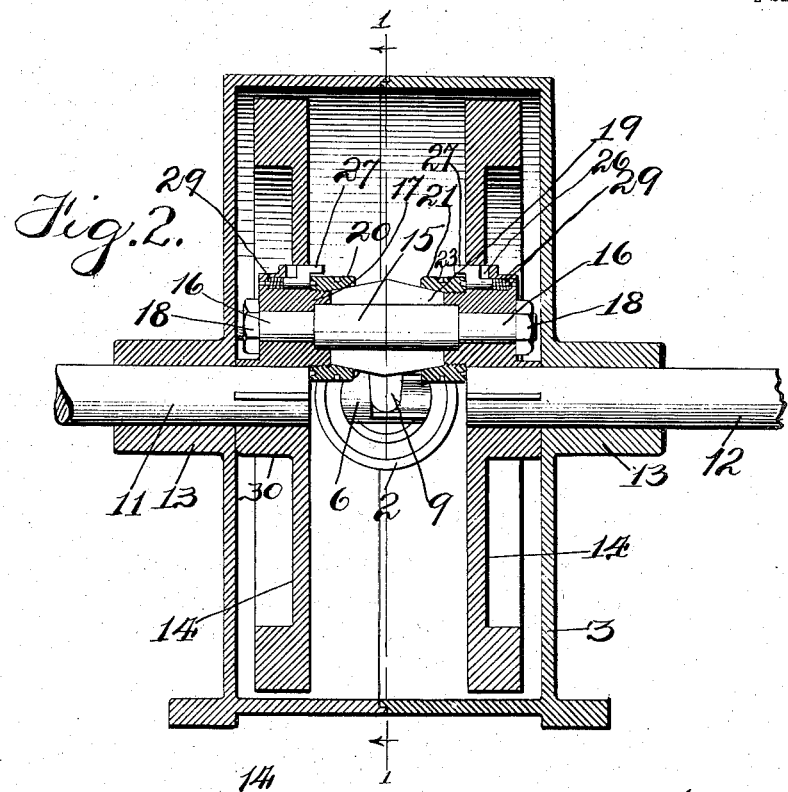
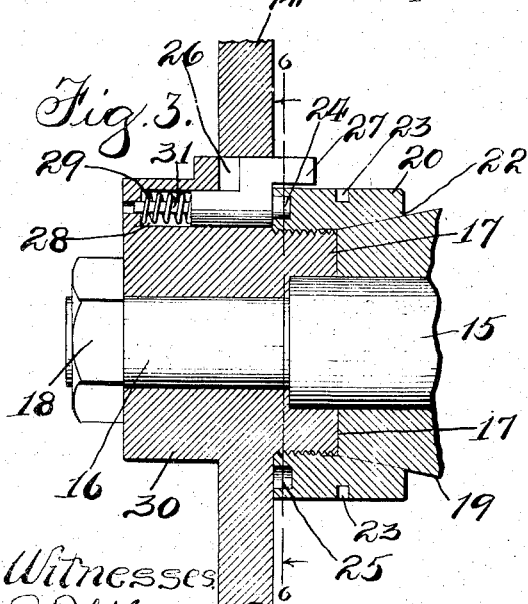
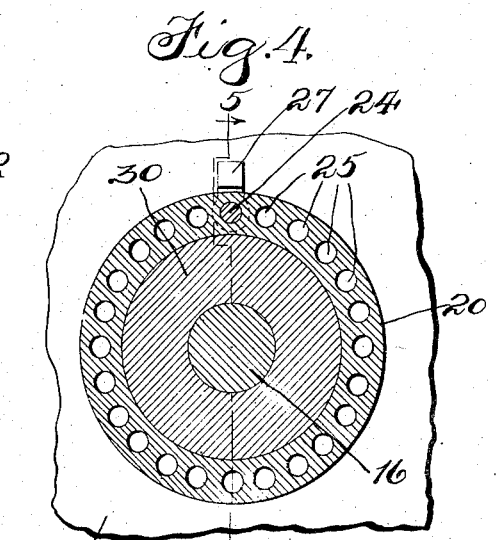
Witnesses
J. B. Weir
M. B. Allstadt
Inventor
Lars Anderson
by Elliott & Hopkins
Attys

UNITED STATES PATENT OFFICE.

LARS ANDERSON, OF CHICAGO, ILLINOIS, ASSIGNOR OF ONE-HALF TO GEORGE W. STAHL, OF CHICAGO, ILLINOIS, AND ONE-HALF TO TRIPLEX GAS ENGINE COMPANY, OF NEW YORK, N. Y., A CORPORATION OF NEW JERSEY.

PISTON-ROD CONNECTION.

No. 840,190.     Specification of Letters Patent.     Patented Jan. 1, 1907.

Application filed March 14, 1904. Serial No. 197,919.

*To all whom it may concern:*

Be it known that I, LARS ANDERSON, a citizen of the United States, residing at Chicago, in the county of Cook and State of Illinois, have invented certain new and useful Improvements in Piston-Rod Connections for Engines, of which the following is a full, clear, and exact specification.

My invention relates to means for connecting the piston-rod of an engine to its crank-shaft.

One of the objects of my invention is to provide simple and efficient means for tightening the piston-rod to take up wear on the crank and for connecting the crank and rod together.

With these ends in view my invention consists in certain features of novelty in the construction, combination, and arrangement of parts by which the said objects and certain other objects hereinafter appearing are attained, all as fully described with reference to the accompanying drawings and more particularly pointed out in the claims.

In the said drawings, Figure 1 is a vertical longitudinal sectional view of a gasolene or explosion engine of the double-opposed cylinder type provided with my improvements. Fig. 2 is a cross-section of the engine on the line 4 4, Fig. 1. Fig. 3 is an enlarged detail section on the line 5 5, Fig. 6; and Fig. 4 is a cross-section on the line 6 6, Fig. 3.

The crank-shaft is preferably made in two parts 11 12, journaled in suitable bearings 13 in the sides of the casing 3, and to each of these parts 11 12 is keyed a disk or fly wheel 14, which constitutes a part of the crank, the pin of which is constituted by a separate member or pin 15, having reduced ends 16, passing through bosses 17, formed on the inner faces of the fly-wheels and held in place in said bosses by outside nuts 18. Any number of piston-rods and pistons may be employed in connection with my improvements; but in this exemplification of the invention I have shown two, and each of these is formed at its end adjacent to the crank-pin 15 with a section of a box 19, extending around the crank-pin and each being less than half of a circle, so that while the boxes 19 are bearing against the crank-pin they may oscillate with reference to each other as the crank-pin revolves. These box members 19 are in the form of an arc in cross-section; but in longitudinal section they are conical or tapered at both ends, as shown in Figs. 4 and 5, and inserted over both ends of both of them are two collars 20 21, one of which is shown in detail in Figs. 5 and 6, but which are the same in construction and operation, and hence a description of one will suffice for both. One end of each of these collars, it will be seen, has a flaring or funnel-shaped interior, as shown at 22, which fits over the conical end of the box members 19, while the opposite end of the collar is screw-threaded on the bosses 17, and thereby confines the box members 19 on the crank-pin 15, and by screwing said collars 20 21 toward each other, it will be seen, any lost motion resulting from wear between the crank-pin and box members may be readily taken up. The collars 20 21 may be rotated for this purpose by a suitable wrench inserted in wrench-sockets 23 or by any other suitable means, and they may be held to their adjustment by stops or locks 24, adapted to enter any one of a series of perforations or sockets 25 in the end of the collar. In order that the stop or lock 24 may be disengaged at will, it is slidably mounted in a recess 26 in the fly-wheel and is provided with a thumb-piece 27, projecting outwardly therefrom over the collar. The lock or stop is pressed normally toward the collar by a suitable spring 28, arranged in a socket 29 in hub 30 of the fly-wheel on a reduced stem 31.

Having thus described my invention, what I claim as new therein, and desire to secure by Letters Patent, is—

1. The combination of a piston-rod having a segmental box member thereon at one end thereof, a crank-pin against which said member bears, a boss surrounding said pin, a retaining-collar carried by said boss and encompassing said crank-pin and the end of said box member, said collar and member having coöperating inclined surfaces where they contact with each other, means for adjusting said collar along said member to take up wear, means for locking said collar in adjusted position, a crank-shaft, and connections between said collar and pin and said shaft.

2. The combination of a piston-rod, provided with a segmental box member thereon having conical ends, a crank-pin against which said member bears, collars embracing said crank-pin and member, means for adjusting said collars relatively to said member, a crank-shaft, and means for connecting said collars and pin with said crank-shaft.

3. The combination with a piston-rod, provided with a segmental box member thereon, a crank-pin, means for tightening said box member against said pin comprising an adjustable collar, a detachable lock for holding said collar up to its adjustment, said lock being provided with a projection whereby the lock may be disengaged, a crank-shaft and means for connecting said pin to said shaft.

4. The combination of a piston-rod, provided with a segmental box member thereon, a crank-pin against which said member bears, means for tightening said member against said crank-pin comprising an adjustable collar, a lock for holding said collar up to its adjustment, a spring for pressing said lock into engagement, said lock being provided with a thumb-piece projecting over said collar whereby the lock may be disengaged, a crank-shaft, and means for connecting said shaft to said pin.

5. The combination of a piston-rod, provided with a segmental box member thereon, a crank-shaft, a revoluble member secured to said shaft and constituting the arm of the crank, a threaded boss formed on said revoluble member, a crank-pin projecting from said threaded boss and against which pin said segmental member bears, and means for tightening said segmental member on said pin comprising a collar embracing said segmental member and threaded on said boss.

6. The combination of a piston-rod, provided with a segmental box member thereon having conical ends, a two-part crank-shaft, two fly-wheels secured to the parts of said crank-shaft respectively and having threaded bosses on their opposed faces, a crank-pin having its ends secured in said bosses and connecting said fly-wheels together, and collars threaded on said bosses and embracing said segmental member.

7. The combination of a piston-rod, provided with a segmental box member thereon, a crank-pin against which said member bears, a crank-shaft, a crank-arm member securing said shaft to said pin, a collar adjustably connected to said crank-arm member and embracing said pin and box member, a lock for said collar socketed in said crank-arm member and having a portion projecting outwardly through said crank-arm member and accessible for releasing said lock.

LARS ANDERSON.

Witnesses:
F. A. HOPKINS,
M. B. ALLSTADT.